Nov. 25, 1952  W. E. JOHNSON  2,618,915
MACHINE PARTS POLISHING TOOL

Filed Nov. 17, 1949  2 SHEETS—SHEET 1

INVENTOR.
William E. Johnson
BY
ATTORNEYS.

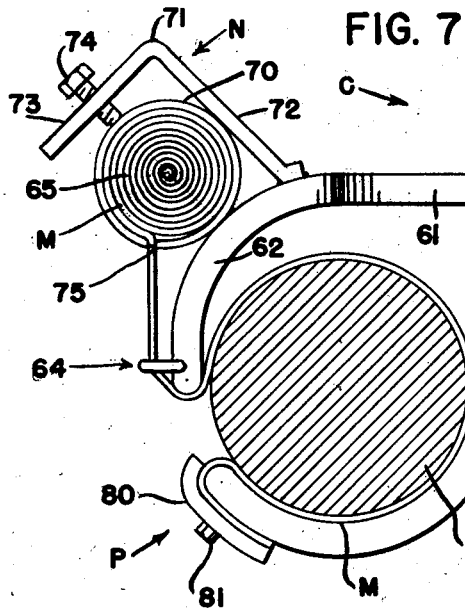
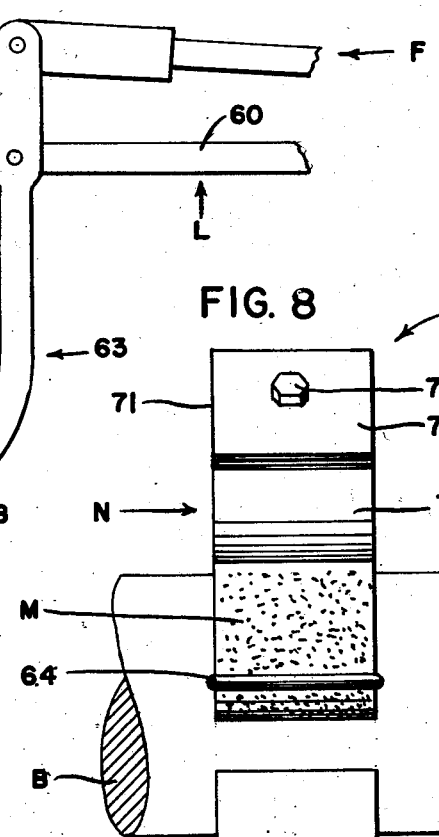
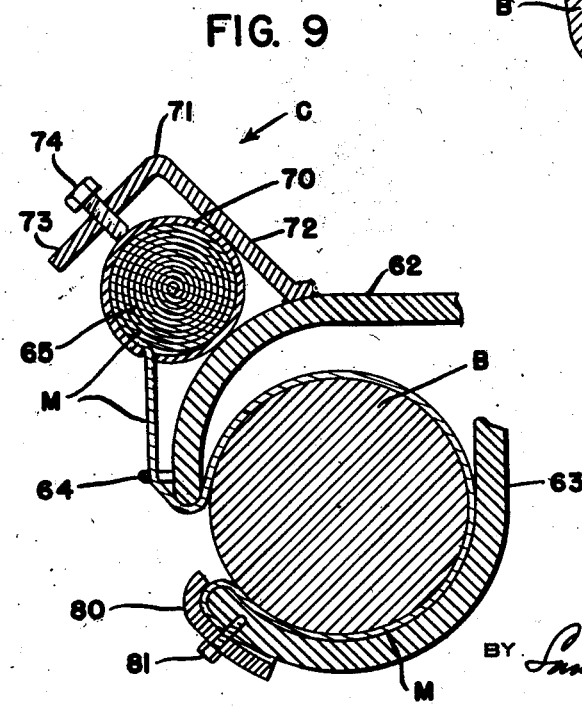

Patented Nov. 25, 1952

2,618,915

UNITED STATES PATENT OFFICE 2,618,915

MACHINE PARTS POLISHING TOOL

William E. Johnson, Beebe, Ark.

Application November 17, 1949, Serial No. 127,890

2 Claims. (Cl. 51—187)

This invention relates to devices to dress machine parts and more specifically to hand tools to polish machine and like parts, such as have, for example, substantially circular transverse cross sections. An example of such a part is the crank pin of a crank shaft. However, the use of the new tool is wider, since it may be employed on journals generally or, in fact, wherever a relatively slender object, capable of being rotated, requires polishing.

An important object of the invention is to provide a hand tool having means to automatically adjust or fit the dressing means of the tool to the peripheral contour of the part being dressed.

Another important object is to provide a tool, as described, which will fit the contour, for example, of a crank pin over nearly 360° of the pin's circumference.

A further important object is to provide a hand tool, including hand-gripped means so associated with the other means of the new tool that the operator will be able to quickly sense, the extent of the pressure of the dressing means against the periphery of the part being dressed.

Furthermore, a very important object is to provide a tool which may be (and generally is) employed on the machine parts being dressed while the machine is in operation. That is, there is no time-consuming stopping and restarting of the machine during dressing operations.

A defect of tools adapted to polish rotating machine parts and employing flexible supports for the dressing means is that the flexible means is inclined to roll or bunch when the tool is in use. An object of this invention is to provide means to releasably grip and carry the flexible support of this new tool in such a way that rolling up of the flexible support is eliminated.

Another object is to provide a tool as described which is adapted to dress machine and like parts rotating either clockwise or counterclockwise.

In addition, the new tool is adapted to polish journals without removing steady rests from the machines.

Compared with the conventional hand polishing method, employing seesaw motions, the new tool will polish a crankshaft in substantially one-third the time required for the conventional method.

Other objects and advantages of the invention will be apparent during the course of the following detailed description of the invention, taken in connection with the accompanying drawing, forming a portion of this disclosure, and in which drawing:

Fig. 7 is a side elevation of a second form of the new tool in use.

Fig. 8 is a forward end elevation of the tool of Fig. 7 in position to grasp a machine part.

Fig. 9 is a fragmentary longitudinal section of the forward end of the tool of Figs. 7 and 8.

Figure 1:
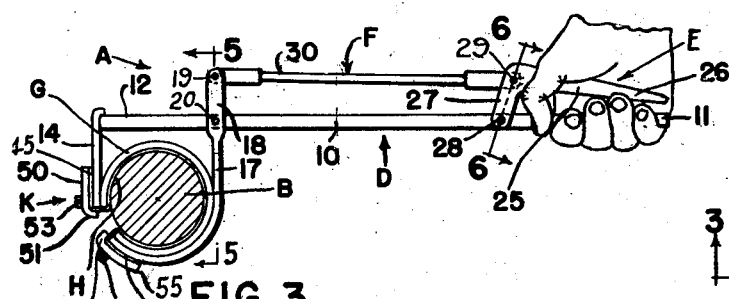
Fig. 1 is a side elevation of the new tool in use.
Figure 2:
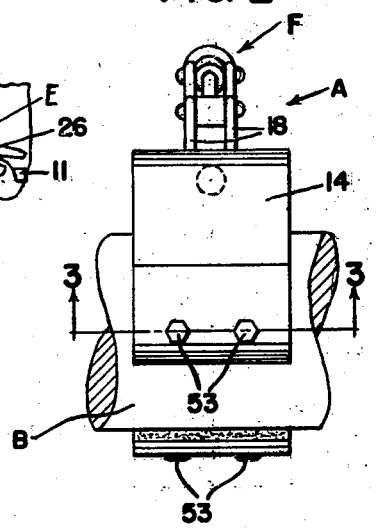
Fig. 2 is an enlarged forward end elevation of the new tool in position to grasp a machine part.
Figure 3:
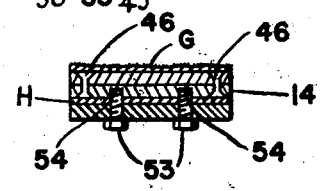
Fig. 3 is a section of the new tool substantially on the line 3—3 of Fig. 2.
Figure 4:
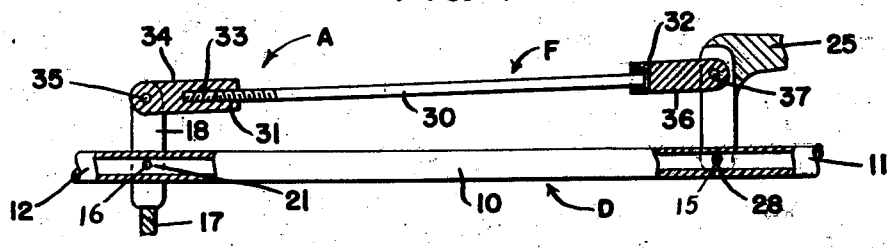
Fig. 4 is a fragmentary longitudinal section through the hand gripped means, and adjusting means therefor, of the new tool.
Figure 5:
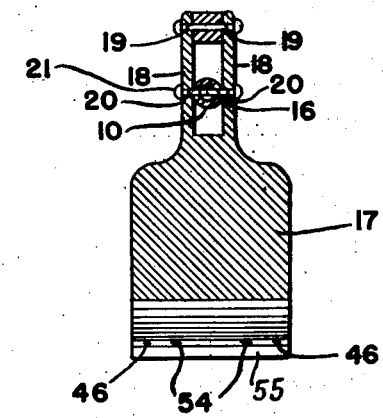
Fig. 5 is an enlarged transverse section substantially on the line 5—5 of Fig. 1.
Figure 6:
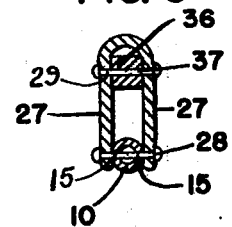
Fig. 6 is an enlarged fragmentary transverse section substantially on the line 6—6 of Fig. 1.

In the drawings, wherein for the purpose of illustration are shown two forms of the invention and wherein similar reference characters designate corresponding parts throughout the several views, the letter A designates one form of the new tool; B designates a part which may be dressed by the new tool, and C designates a second form of the new tool.

The new tool A comprises a support structure D, provided with hand-gripped means E, and associated with means F to adjust the extent of movement of the means E, means G to back and automatically adjust a dressing means H to the peripheral contour of the part B, and means K to detachably connect the means H to the support structure D.

It is preferred to provide the support structure D of metal, such as iron or steel and this structure includes a support section 10 which may be an elongated substantially straight rod or tube having a rear end or handle portion 11, which constitutes a part of the hand-gripped means E, while the support's forward end portion 12 is provided with and supports a first depending shoe section 14 which may be a rigid metallic strap, welded at one edge portion to the extremity of the forward end portion 12. Intermediate its end portions, the support section 10 is provided with a pivot accommodating, transverse opening 15, and between this opening and the forward end portion 12, there is a second pivot-accommodating transverse opening 16 with the axes of the openings in substantial parallelism.

A further part of the support structure D comprises a second depending shoe section 17 which may be a substantially rigid metal strap having a bifurcated upper end to provide two ears 18 each having an outermost pivot-accommodating opening 19 and an innermost pivot-accommodating opening 20, with a pivot 21 such as a pin, extending through the openings 16 and 20, whereby the shoe section 17 is supported by the support section 10 and may swing toward and away from the shoe section 14, which it faces. It will be noted that the shoe section 14 is partly curved so that it forms substantially a J in transverse section.

Pivotally carried by the support section 10 is another portion of the hand-gripped means E and comprising a suitable handle portion 25, having a rear hand-grip 26 suitably shaped to conform to the contour of the palm of the operator's hand, and bifurcated adjacent its forward end to provide two ears 27 having aligning perforations to accommodate a pivot pin 28 which also extends through the opening 15, whereby the portion 25 is rockably mounted upon the section 10. Outwardly of the perforations last mentioned are a pair of axially aligned perforations 29 for a purpose next detailed.

The means F to adjust the extent of movement of the hand-gripped means E preferably comprises a substantially straight metallic rod 30 having one screw threaded end 31, and the opposite end provided with an enlargement 32 having a circular periphery. The screw threaded end 31 extends into the screw-threaded bore 33 of a pivoted first member 34 carried by a pivot pin 35 extending through the openings 19 and opening in the member 34, the one end portion thereof opposite the end portion containing the bore 33. The enlargement 32 is rotatably accommodated in a pivoted second member 36 which is provided with a socket for the enlargement 32 extending from one end portion thereof and the wall at the mouth of the socket may be peened to retain the enlargement. The opposite end portion of the member 36 is pivoted to the ears 26 by a pin 37 extending through the perforations 29 and an axially-aligning perforation in the member 36. By rotating the rod 30 in one direction, the screw threaded end thereof will be fed into the socket of the member 34 thus shortening the distance between the two members 34 and 36 and raising the handle portion 25 so that its effective throw will be greater, or rotating the rod 30 in the other direction will have the opposite effect upon the handle portion 25.

The means G to back and automatically adjust the dressing means H to the peripheral contour of the part B, comprises a sheet or length of flexible material, as leather, having a width preferably substantially that of the shoe sections 14 and 17 and a length sufficient to extend substantially completely around the part B, and having portions 40. This sheet arches from one shoe to the other.

Any suitable sheet or length of flexible material having a polishing or an abrasive-carrying outer face with suitable material thereon may constitute the dressing means H just so it is of tough-backing material, as fabric, and this sheet may be similar in breadth to the sheet of the means G and have end portions 45 to spare. The sheet constituting the means H may be secured at its end portions 40 to the shoe sections 14 and 17 by at least two spaced-apart rivets 44, so that it arches from one shoe to the other, preferably in contact with the sheet of the means G.

Means K to detachably grip the means H and connect the means G to the support structure D includes a plate or retaining member 50 with one end portion 51 thereof curved to extend over the lower or free edge of the first shoe section 14 but spaced therefrom since preferably one end portion of the sheet of the means H is extended over this free edge and over the outer face of the lower portion of this shoe and the main portion of the member 50 parallels this lower portion. Means to clamp this member 50 in position as described may be at least two spaced-apart screws 53 with their shanks extending through suitable openings in the member 50 and one end portion of the sheet of the means H and into screw-threaded sockets 54 in the shoe 14. Similarly, a second plate or retaining member 55 is provided, curved to the contour of the free end portion of the shoe section 17 and having a lower end portion 56 arranged similarly to that of the end portion 51. Screws 57 (at least a pair of spaced-apart screws) are employed similarly to the screws 53 and the free end portions of their shanks extend into sockets, similar to the sockets 54 in the shoe section 17.

From the foregoing it is now apparent that, since the means H is removable by removing the screws 53 and 57 and retaining members 50 and 55 these sheets may be readily renewed yet, when held by the means K and backed by the means H, it will not tear loose nor creep or bunch. When the means H is in place, the operator, with the shoe portion 17 spread away from the shoe portion 14, extends the tool A with the means G and H over the part B and then presses down on the handle portion 11 which causes the means G and H to wrap around the part B substantially as in Fig. 1. With the part B rotating, the abrasive of the means G will dress or polish the periphery of the part B without the necessity of the operator swinging the tool in an arc.

Referring now to Figures 7, 8 and 9, the form C of the invention preferably comprises a support structure L, provided with hand gripping means which is preferably exactly like the hand gripping means E, means to adjust the extent of movement of the means E, preferably exactly like the means F, dressing means M, means N to support a supply of the means M, and means P to detachably connect the means M to the support structure L.

The support structure L is preferably of metal, such as iron or steel and includes a support section 60 which is much like the section 10 and has a handle portion exactly like the handle portion 11, while the support section 60 has a forward end portion 61 provided with a depending rigid first shoe section 62 preferably formed of a curved continuation of the section 60, and having a curved or rounded free end. Intermediate its end portions, the support structure 60 is provided with opening just like the openings 15 and 16.

An additional part of the support structure L comprises a second depending shoe section 63 which may be a substantially rigid metal strap with a rounded or curved free lower end and having a bifurcated upper end to provide ears like the ears 18 with openings, like the openings 19 and 20, and with a pivot pin, like the pivot 21, serving the same purpose as the latter. The shoe section 63 is partly curved, like the shoe section 17 so that it, too, forms substantially a J in transverse section.

The shoe section 62 adjacent its free end is provided with a guide means 64 for the dressing means M and this guide means may be a pair of paralleling arms, secured at one end of each to the outer face of the shoe section 62 and connected at their other ends by a substantially straight bar portion paralleling the adjacent shoe face and employed as hereinafter detailed.

The dressing means M is preferably in the form of an elongated sheet or length of flexible material having a polishing or an abrasive-carrying outer face, with suitable material thereon for dressing the part B, and this material suitably attached to a backing of tough flexible material, as fabric. The sheet or length is preferably supplied in rolls, as at 65.

Means N to support a supply of the means M is shown as an elongated, longitudinally slotted cylinder 70 of springy material, preferably metal, as springy steel, which is mounted upon the shoe section 62 intermediate its ends and held in place by an inverted L-shaped bracket 71 extending outwardly and upwardly from the shoe section 62, with one arm 72 of the latter soldered or welded to the section 62 and the other arm 73 carrying a screw threaded perforation to accommodate a set screw 74 the free end of which bears against the outer face of the cylinder 70 spaced from the slot 75 thereof so that tightening of this screw against the cylinder will distort the latter and cause it to grip the roll 65 when the roll is large and also cause the walls of the slot 75 to move into gripping relationship with the material, preventing rotation thereof but, when the screw is rotated to allow the cylinder to resume its original shape, the roll may be manually rotated to feed its material through the slot 75.

From the slot 75 the material forming the means M is fed between the bar portion of the guide means 64 and the face of the shoe section 62 then over the curved or rounded lower free end of the latter, upwardly and around in a loop, as is the dressing means H, and then over the rounded lower or free end of the shoe section 63 and upwardly a short distance over its outer face.

Means P to detachably connect the means M to the shoe section 63 of the support structure L may comprise plate or retaining member 80 curved to fit over (but spaced from) the curved or rounded edge and the adjacent outer face of the free end portion of the shoe section 63, with the free end of the material of the means M gripped between the shoe section 63 and the member 80. A pair of spaced-apart screws 81 with their shanks extending through suitable perforations in the member 80 through the material of the means M and into screw-threaded openings in the shoe section 62 are adapted to retain the member 80 in place to grip the adjacent material of the means M.

The means M of the form C may be readily renewed when used up by slipping a new roll into the cylinder 70 and threading it into place. Of course, having this renewable supply of the means M at hand is time saving, as is now obvious.

The tool of the form C is manipulated to dress a part B exactly like the tool of the form A, the major difference being in the elimination of the means K of the form A in the form C and the addition to form C of the means N.

It will be noted that the two portions of the lengths constituting the means H, where they extend over the free edges of the shoe sections do not ever contact each other, to quickly wear down each other due to vibrations, since they are protected by the curved end portions 51 and 56 of the members 50 and 55 respectively.

Because the means G, H and M are flexible sheets, the operator, while using the tool, will quickly learn to "feel," through his hand grasping the handle portions 11 and 25, the extent of pressure of the means H or M upon the periphery of the part B, and can vary the pressure. This "feel" is not possible where flexible means similar to my means G, H or M are not employed.

Because the means G is secured to the shoes 14 and 17 as described, and the means H is also secured thereto as described and positioned as it is with reference to the sheet of the means G, and the means M secured as described, the lengths of the means H or M will not be apt to creep, bunch nor rock when dressing the machine part.

Various changes may be made to the forms of the invention herein shown and described without departing from the spirit of the invention or scope of the claims.

What is claimed is:

1. In a crank pin polishing tool a first shoe, a second shoe, with both of said shoes having opposite faces, a support, means supporting one of said shoes from said support, means supporting the other of said shoes from said support spaced from and facing the first shoe, means for oscillating at least one of said shoes toward and away from the other shoe, a length of flexible material, provided with polishing material upon one of its faces, means securing the free end portion of said length to one of said shoes with a portion of the material inwardly of said free end arching from one shoe to the other shoe and with said one of said faces of said length of material outermost, means housing the other end portion of said length of flexible material with said other end portion in a roll, comprising an elongated cylinder of springy material carried by the other of said shoes and provided with a longitudinally-extending slot through which a portion of said length, adjacent said roll, extends, and means for moving one wall of said slot toward the opposite wall thereof to releasably grip said portion of said length extending through said slot.

2. In a crank pin polishing tool, a first shoe, a second shoe, with both of said shoes having opposite faces, a support, means rigidly supporting the first shoe from said support, means pivotally supporting the second shoe from said support, spaced from the first shoe, means for oscillating the second shoe toward and away from the first shoe, a length of flexible material, provided with polishing material upon a face thereof, means securing one end portion of said length to one of said shoes, with a portion of said length inwardly of said free end arching in the space between said shoes and extending from one shoe to the other shoe, and with said face outermost, means housing the other end portion of said length with said other end portion in a roll, comprising a cylinder of springy material about said roll and provided with a slot extending from end to end of said cylinder and with a portion of said length, adjacent said roll extending through said slot, bracket means extending about a portion of said cylinder, including a rigid bracket portion, and means for moving one wall of said slot toward the other wall thereof to releasably grip said portion of said length extending through said slot, comprising a set screw rotatably carried by said bracket portion and with the shank of said screw bearing against said cylinder adjacent said slot.

WILLIAM E. JOHNSON.

(References on following page)

REFERENCES CITED

The following references are of record in the file of this patent:

UNITED STATES PATENTS

| Number | Name | Date |
|---|---|---|
| 1,025,859 | Calahan | May 7, 1912 |
| 1,565,958 | Reno | Dec. 15, 1925 |
| 1,622,292 | Reno | Mar. 29, 1927 |
| 1,748,313 | Steuber | Feb. 25, 1930 |
| 1,905,821 | Dunbar et al. | Apr. 25, 1933 |
| 1,908,048 | Player et al. | May 9, 1933 |
| 2,376,531 | Egger | May 22, 1945 |

FOREIGN PATENTS

| Number | Country | Date |
|---|---|---|
| 24,277 | Great Britain | Nov. 6, 1902 |
| 158,777 | Germany | May 22, 1904 |
| 169,975 | Germany | Apr. 18, 1906 |
| 389,638 | France | Sept. 14, 1908 |